United States Patent
Kim et al.

(10) Patent No.: US 9,208,811 B1
(45) Date of Patent: Dec. 8, 2015

(54) APPARATUS AND METHOD FOR MEASURING POLE TIP PROTRUSION RATIO FOR A SLIDER

(71) Applicant: Seagate Technology LLC, Cupertino, CA (US)

(72) Inventors: Tae won Kim, Yongin (KR); Tae Young Kim, Yongin (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/565,053

(22) Filed: Dec. 9, 2014

(51) Int. Cl.
G11B 5/60 (2006.01)
G11B 5/48 (2006.01)

(52) U.S. Cl.
CPC .............. *G11B 5/6011* (2013.01); *G11B 5/607* (2013.01); *G11B 5/6076* (2013.01); *G11B 5/488* (2013.01); *G11B 5/4886* (2013.01)

(58) Field of Classification Search
CPC .... G11B 5/6005; G11B 5/6064; G11B 5/102; G11B 5/3133; G11B 5/314; G11B 5/607; G11B 5/6076; G11B 2220/2516; G11B 27/36; G11B 5/1278; G11B 5/3909; G11B 5/3116; G11B 5/3136; G11B 5/6011

USPC ............. 360/55, 317, 125.31, 125.74, 31, 75, 360/234.5
See application file for complete search history.

(56) References Cited

U.S. PATENT DOCUMENTS

| | | | |
|---|---|---|---|
| 6,909,578 B1 | 6/2005 | Missell et al. | |
| 7,089,649 B2 | 8/2006 | Wang et al. | |
| 7,102,853 B2 | 9/2006 | Macken et al. | |
| 7,770,285 B2 | 8/2010 | Bonhote et al. | |
| 7,969,687 B2 * | 6/2011 | Lee et al. | 360/234.5 |
| 8,094,418 B2 * | 1/2012 | Schreck et al. | 360/317 |
| 8,749,920 B1 | 6/2014 | Knutson et al. | |
| 8,837,076 B1 * | 9/2014 | Cheng et al. | 360/75 |
| 2010/0002327 A1 * | 1/2010 | Call et al. | 360/31 |
| 2013/0094104 A1 | 4/2013 | Ngan et al. | |

* cited by examiner

*Primary Examiner* — Ali Neyzari
(74) *Attorney, Agent, or Firm* — Hollingsworth Davis, LLC

(57) ABSTRACT

Methods and apparatuses are implemented to cause a first contact event between a slider and a magnetic recording medium at a first operating temperature, the slider comprising at least a writer, a writer heater, a reader, and a reader heater. Methods and apparatuses are implemented to cause a second contact event between the slider and the medium at a second operating temperature different from the first operating temperature, determine a flying height displacement of the slider for the contact events, and optionally store the flying height displacement.

20 Claims, 8 Drawing Sheets

*FIGURE 1*
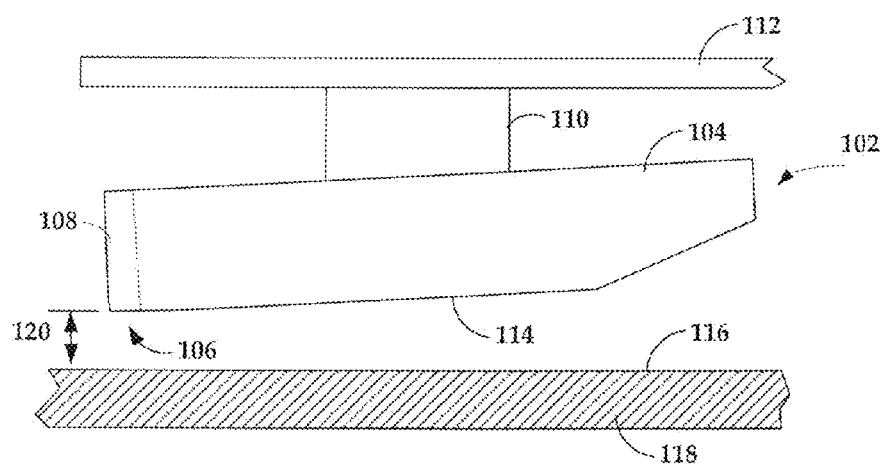
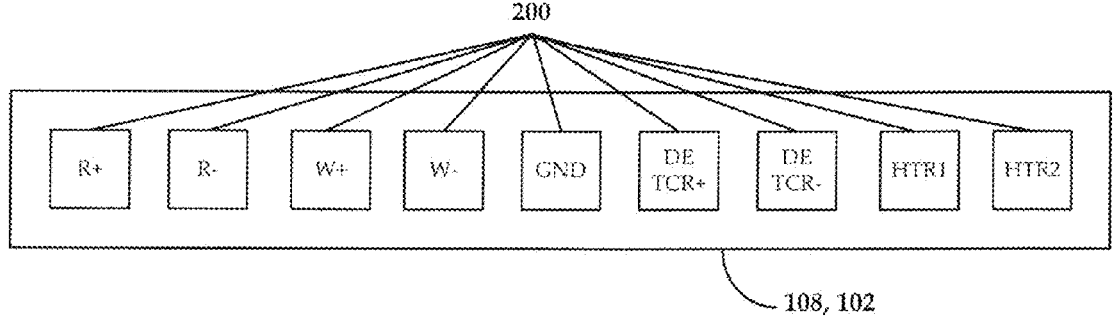
*FIGURE 2*

APPARATUS AND METHOD FOR MEASURING POLE TIP PROTRUSION RATIO FOR A SLIDER

SUMMARY

Embodiments of the disclosure are directed to a method that involves causing a first contact event between a slider and a magnetic recording medium at a first operating temperature, the slider comprising at least a writer, a writer heater, a reader, and a reader heater. The method also involves causing a second contact event between the slider and the medium at a second operating temperature different from the first operating temperature. The method further involves determining a flying height displacement of the slider for the contact events, and optionally storing the flying height displacement for further use.

Further embodiments are directed to an apparatus comprising a slider configured to interact with a magnetic recording medium. The slider comprises a writer, a writer heater proximate the writer, a reader, and a reader heater proximate the reader. The apparatus also comprises a processor coupled to memory. The processor is configured to cause a first contact event between the slider and the a magnetic recording medium at a first operating temperature; cause a second contact event between the slider and the medium at a second operating temperature different from the first operating temperature; determine a flying height displacement of the slider for the contact events; and optionally store the flying height displacement in the memory for further use.

Other embodiments are directed to an apparatus comprising a slider configured to interact with a magnetic recording medium. The slider comprises a writer, a writer heater proximate the writer, a reader, a reader heater proximate the reader, a near-field transducer proximate the writer, and an optical waveguide proximate the near-field transducer. The apparatus also comprises a processor coupled to memory. The processor is configured to cause a first contact event between the slider and the a magnetic recording medium at a first operating temperature; cause a second contact event between the slider and the medium at a second operating temperature different from the first operating temperature; determine a flying height displacement of the slider for the contact events; and optionally store the flying height displacement in the memory for further use.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 1 is a schematic representation of a slider in which the various embodiments disclosed herein may be implemented;

FIG. 2 is a schematic representation of end bond pads on the trailing edge of the slider of FIG. 1;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 3:
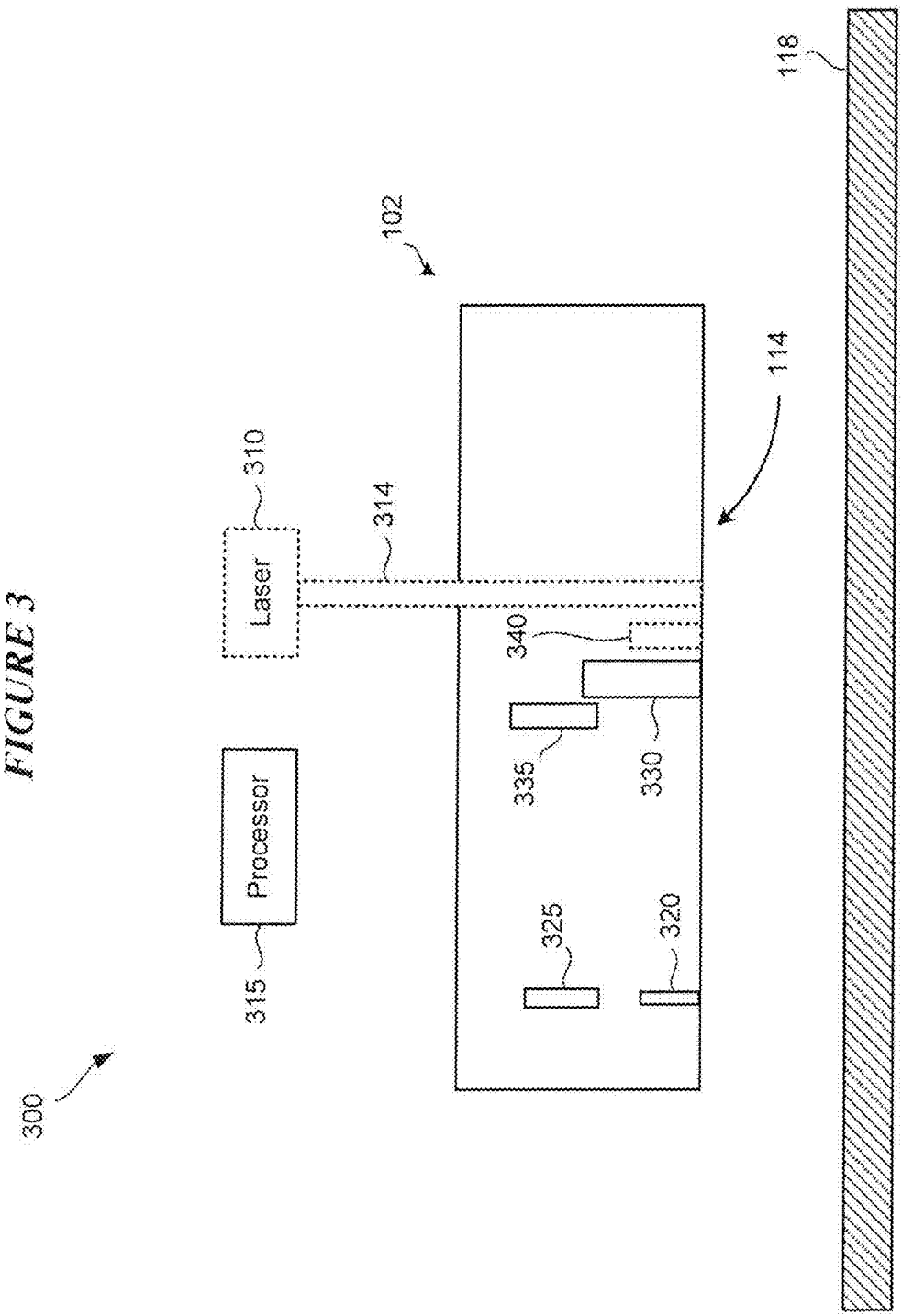
FIG. 3 shows a recording head arrangement in accordance with various embodiments.

The present disclosure generally relates to magnetic recording devices used for data storage. Data storage systems may include one or more transducers that respectively write, via a writer, and read, via a reader, information to and from a magnetic storage medium. The reader and writer are components disposed on an aerodynamic slider of the magnetic recording transducer. It is typically desirable to have a relatively small distance or separation between a transducer and its associated media. This distance or spacing is referred to herein as "head-media separation" (HMS). By reducing the head-media separation, a reader and a writer is generally better able to both write and read data to and from a medium, allowing for an increase in storage capacity (e.g., tracks per inch or bits per inch). Reducing the head-media separation also allows for surveying of magnetic storage medium topography, such as for detecting asperities and other features of the recording medium surface.

A technique of controllably causing protrusion of the magnetic recording head (e.g., the slider of the recording head) during writing and/or reading operations has been developed. A Flying On Demand (FOD) methodology represents one such technique, and involves applying a certain current or voltage to a heater coil in the recording head, causing a pole tip (i.e., an end portion) of the slider to thermally expand and reduce a flying height of the recording head. The FOD current or voltage is varied to cause a corresponding change in fly height of the recording head.

One approach to employing FOD involves gradually increasing of the FOD control signal (current or voltage), causing the recording head to gradually expand, until the pole tip of the recording head comes into contact with the surface of an adjacent magnetic recording medium. The FOD control signal that causes the pole tip to contact the medium surface is measured as a maximum FOD signal. Generally, an FOD control signal of an appropriate level lower than the maximum FOD voltage is estimated and uniformly applied to the magnetic head. However, in actuality, the flying height of a recording head is not uniform and each expansion degree of FOD varies, making it considerably difficult to apply FOD uniformly across disparate recording heads and disk drive systems.

In a single heater system, for example, an FOD heater is typically located between the reader and the writer. In this single heater scenario, the pole tip protrusion of the reader and writer responsive to FOD heater power is similar. However, in a dual heater system, where a dedicated FOD heater is located near the reader and the writer respectively, the two FOD heaters are controlled independently. In a representative dual FOD heater scenario, the pole tip protrusion of the reader and writer will be changed asymmetrically according to the selection of heater to which FOD power is applied. However, there is presently no way to measure the pole tip protrusion of the writer directly in an assembled drive. As such, the assumption is that the reader and write pole tip protrusion changes identically and adjustment of heater power is based on this assumption. Using a predetermined value for FOD power is another option, but this approach doesn't account for differences in characteristics of individual drives, heads, head-wafers etc. Accordingly, there remains the danger of a head-to-disk interface (HDI) touch and a reduction in disk drive performance resulting from application of an incorrect FOD write heater power signal.

To accurately know FOD reader and writer power, reader and writer protrusion must be accurately determined. Reader protrusion can be measured directly by its read sensor. However, writer protrusion cannot be measured directly because the writer does not have a read sensor or similar sensing capability. FOD read heater power can be determined by the reader itself measuring reader protrusion, such as by reading a specific pattern on the disk used for measuring protrusion in the drive. In contrast, write heater power cannot be determined directly because it is not possible to measure the writer's protrusion directly. As a consequence, and as discussed above, an assumption has been made that reader and writer protrusion is almost same (e.g., identical or 1:1). In some approaches, a fixed predetermined value for the reader and writer protrusion ratio has been used to determine writer heater power. Experimentation has determined that the assumptions central to these approaches have been incorrect.

Embodiments of the present disclosure are directed to a method and apparatus for measuring a pole tip protrusion ratio of a writer and a reader of a magnetic recording head. Some embodiments are directed to measuring a pole tip protrusion ratio of a writer and a reader using a difference in flying height displacement of a slider in different environmental conditions (e.g., different temperature environments). Some embodiments involve measuring a pole tip protrusion ratio of a writer and a reader using a difference in writer and reader heater power that results in flying height displacement of a slider in different environmental conditions. Further embodiments involve applying an appropriate writer heater power (e.g., an FOD control signal) during write operations based on a pole tip protrusion ratio measurement in accordance with the present disclosure.

Turning now to FIG. 1, a side view of a slider 102 is illustrated. The slider 102 includes a slider body 104 and a transducer portion 106 provided within overcoat 108 at the trailing edge of the slider 102. The slider 102 is attached via suspension 110 to an arm 112. The air bearing surface (ABS) 114 of the slider 102 is shown proximate the surface 116 of a magnetic recording medium 118. The fly height 120 between the slider 102 and the disk 118 is also indicated. FIG. 2 illustrates the bond pads 200 on the trailing edge of the slider 102. These bond pads 200 are directly connected through the overcoat 108 to various components, e.g., reader, writer, heaters, temperature sensors, etc. of the slider 102.

The configuration shown in FIG. 2 illustrates a current industry standard of nine pads which include bond pads R+ and R− for the reader, W+ and W− for, the writer, GND for ground (which defines the ground potential of the slider body 102), DETCR+ and DETCR− for the temperature sensor (e.g., a dual-ended coefficient of resistance temperature sensor), and HTR1 and HTR2 for the writer and reader heaters, respectively. During fabrication of a slider 102, the bond pads are electrically connected to the electrical connections (e.g., traces) along the suspension 110. It should be noted that more or less bond pads may be used as appropriate to a specific application, e.g., the need for a dedicated bond pad, additional bond pads to accommodate additional readers, writers, heaters, sensors or other components, additional bond pads to accommodate a heat-assisted magnetic recording (HAMR) laser, etc.

FIG. 3 shows a recording head arrangement 300 in accordance with various embodiments. The recording head arrangement 300 includes a slider 102 positioned proximate a rotating magnetic medium 118. The slider 102 includes a reader 320 and a writer 330 proximate the ABS 114 for respectively reading and writing data from/to the magnetic medium 118. The writer 330 includes a corresponding heater 335, and the reader 320 also includes a corresponding heater 325 according to various embodiments. Each of the heaters 325 and 335 is thermally coupled to the slider 102 and may be a resistive heater that generates heat as electrical current is passed therethrough. The heaters 325 and 335 are not limited to resistive heaters, and may include any type of heating source. The writer heater 335 can be powered to cause protrusion of the ABS 114 predominately in the ABS region at or proximate the writer 333, and the reader heater 325 can be powered to cause protrusion of the ABS 114 predominately in the ABS region at or proximate the reader 320. Activation of both the writer and reader heaters 335 and 325 causes protrusion of the pole tip region of the slider 102 which includes both the writer 330 and the reader 320. Power can be controllably delivered independently to the heaters 325 and 335 to adjust the fly height (e.g., clearance) of the slider 102 relative to the surface of the recording medium 118 in accordance with embodiments of the present disclosure.

According to some embodiments, the recording head arrangement 300 can be configured for heat assisted magnetic recording. In such embodiments, writer 330 is located proximate a laser arrangement including light source 310 (e.g., laser diode). The light source 310 can be mounted external, or integral, to the slider 102. The light source 310 energizes a near-field transducer (NFT) 340 via a waveguide 314 proximate the ABS 114 and writer 330 respectively. It is understood that embodiments of the disclosure may be implemented in a wide variety of recording heads, including those configured for HAMR.

Figure 4:
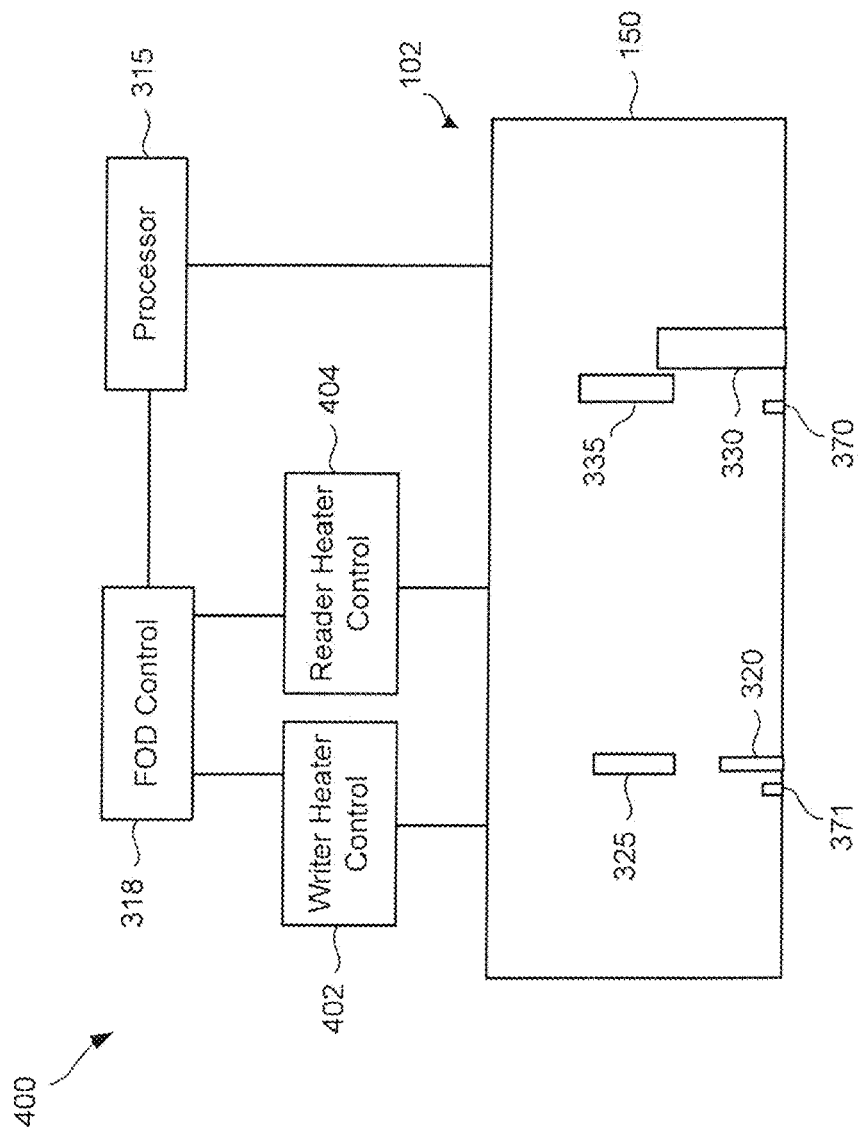
FIG. 4 illustrates a recording head arrangement in accordance with various embodiments.

FIG. 4 illustrates a recording head arrangement 400 in accordance with various embodiments. The recording head arrangement 400 includes a slider 102 comprising a reader 320, a reader heater 325, a writer 330, and a writer heater 335. Power can be controllably delivered independently to the heaters 325 and 335 to adjust the fly height of the slider 102 relative to the writer 330 and reader 220 in accordance with embodiments of the present disclosure. In the embodiment shown in FIG. 4, the slider 102 includes at least one sensor that can be used to measure fly height of the slider 102. In some embodiments, a sensor useful for measuring slider fly height can be situated near each of the writer 330 and the reader 320, thereby providing for individual fly height measurements for the writer 330 and the reader 320.

In the embodiments illustrated in FIG. 4, a thermal sensor 370 is situated proximate the writer 330 and a thermal sensor 371 is situated proximate the reader 320. Although the thermal sensors 370 and 371 can be of varying type, thermal sensors and 370 and 371 are described herein as a resistance temperature sensors composed of materials having a temperature coefficient of resistance (TCR). Other types of thermal sensors can be employed, such as a varistor or a thermocouple, for example. One example of a TCR sensor is a dual-ended temperature coefficient of resistance sensor (DE-TCR). Another example of a TCR sensor is a ground-split temperature coefficient of resistance sensor (GSTCR). A TCR sensor measures temperature change by measuring the change in resistance, or rate of change in resistance, across the sensor. The thermal sensors 370 and 371 measure the temperature change at ABS 114 at or near the writer 330 and reader 320, respectively, induced by all thermal condition changes from air pressure, clearance, head operation, and contact, among other changes. The change or rate of change in temperature measured by the thermal sensors 370 and 371 can be translated to clearance or clearance change between the slider 102 and an adjacent surface of a magnetic recording medium. The signal produced by the thermal sensors 370 and 371 can also be used to detect contact between the slider 102 (e.g., pole tip) and the magnetic recording medium.

FIG. 4 further shows a writer heater control 402 and a reader heater control 404 respectively connected to the writer heater 335 and reader heater 325. Power (current or voltage) supplied to the writer heater 335 and reader heater 325 is controllably adjusted by the writer and reader heater controls 402 and 404, respectively. A processor 315 can be configured to adjust the power (e.g., FOD current or voltage) supplied to the heaters 325 and 335. For example, an FOD writer heater signal can be supplied to adjust the heat generated by the writer heater 335 independent of an FOD reader heater signal supplied to adjust the heat generated by the reader heater 325. According to various embodiments, pole tip protrusion is determined for each slider of a disk drive system in-situ, so that the FOD control signals are tailored to individual sliders of a given disk drive system. As such, the risk of an unintended HDI touch resulting from an incorrect FOD writer heater power signal, for example, can be reduced or eliminated.

Figure 5A:
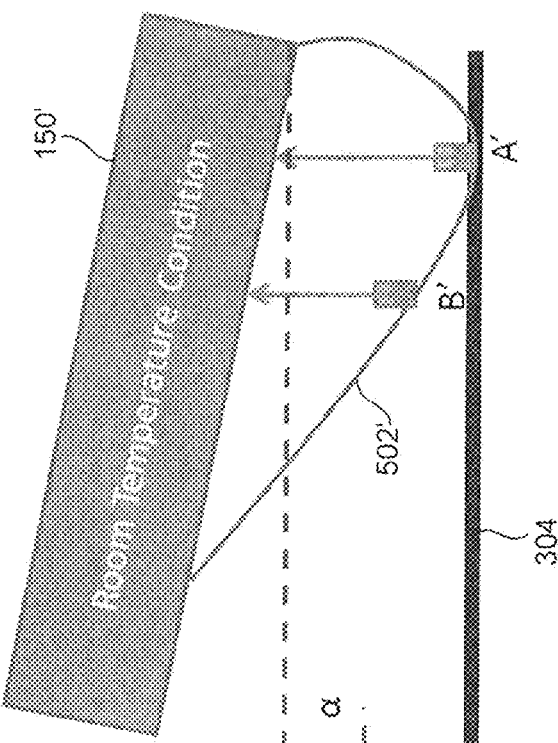
FIGS. 5A and 5B show a representative slider flying over a magnetic recording medium at different operating temperatures in accordance with embodiments of the disclosure.
Figure 5B:
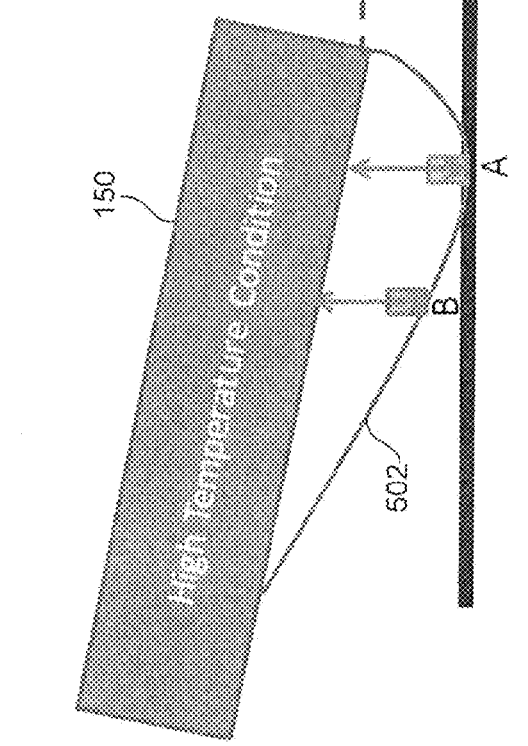

FIGS. 5A and 5B show a representative slider 150, 150' flying over a magnetic recording medium 304 at different operating temperatures in accordance with embodiments of the disclosure. The slider 150 shown in FIG. 5A is flying lower to the surface of the medium 304 than the slider 150' shown in FIG. 5B as a consequence of the operating temperature of the FIG. 5A scenario being greater than that of the FIG. 5B scenario. For example, the operating temperature for the FIG. 5B scenario may be room temperature, and the operating temperature for the FIG. 5A scenario may be a temperature greater than room temperature (e.g., 10, 20, 30, or 40° C. warmer). At elevated temperatures, as indicated in FIG. 5A, the slider 150 flies closer to the medium 304 than at lower temperatures, thereby requiring a smaller pole tip protrusion 502 to contact the surface of the medium 304. At reduced temperatures, as indicated in FIG. 5B, the slider 150' flies further from the medium 304 than at elevated temperatures, thereby requiring a larger pole tip protrusion 502' to contact the surface of the medium 304.

The relative difference in fly height of the slider between the two contact scenarios shown in FIGS. 5A and 5B is referred to as the flying height displacement, $\alpha$, of the slider (e.g., referenced from the trailing edge of the slider in FIGS. 5A and 5B). The flying height displacement, $\alpha$, of the slider can be determined in different ways according to the disclosure, and is a measure of pole tip protrusion of the slider. As was discussed previously, the pole tip protrusion of the slider is based on the pole tip protrusion of the writer and the reader, which will be changed asymmetrically according to the selection of heater to which power is supplied. In FIG. 5A, the pole tip protrusion of the writer of slider 150 is denoted by the distance A between the ABS surface of the slider 150 and the surface of the medium 304. The pole tip protrusion of the reader of slider 150 is denoted by the distance B between the ABS surface of the slider 150 and the surface of the medium 304. In FIG. 5B, the pole tip protrusion of the writer of slider 150' is denoted by the distance A' between the ABS surface of the slider 150' and the surface of the medium 304. The pole tip protrusion of the reader of slider 150' is denoted by the distance B' between the ABS surface of the slider 150' and the surface of the medium 304.

According to some embodiments, the flying height displacement, $\alpha$, of the slider can be measured directly by measuring the difference in fly height of the slider while operating at different operating temperatures. In other embodiments, the flying height displacement, $\alpha$, of the slider can be measured indirectly based on power supplied to the writer and heater of the slider while operating at different operating temperatures. Pole tip protrusion of the writer and reader which corresponds to the flying height displacement, $\alpha$, of the slider can be determined by calculating the ratio of flying heights measured for the different operating temperatures or the ratio of writer heater power and reader heater power measured for the different operating temperatures. Details of these methodologies are provided as follows.

Figure 6:
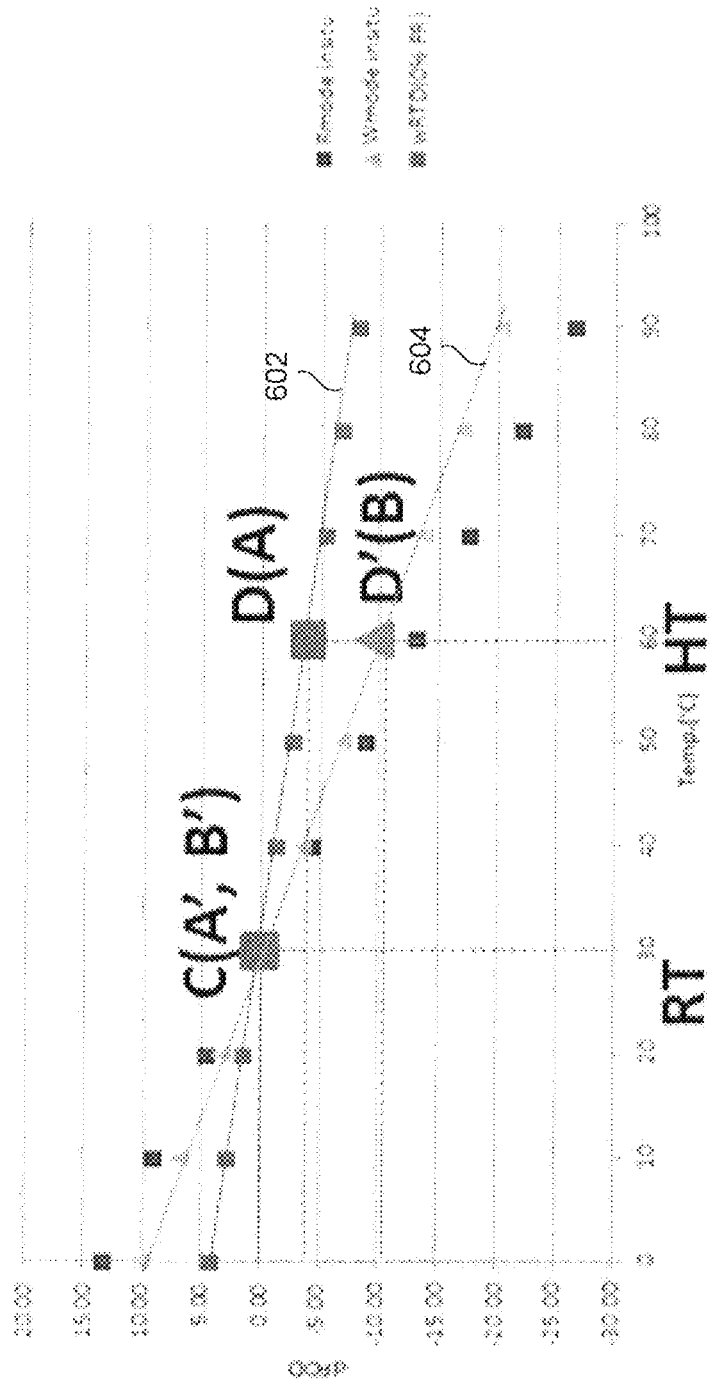
FIG. 6 is a graph of delta FOD (dFOD) as a function of operating temperature developed from computer simulation in accordance with embodiments of the disclosure.

Referring now to FIG. 6, a graph of delta FOD (dFOD) as a function of operating temperature is shown developed from computer simulation. FIG. 6 graphically shows pole tip protrusion rate measurements resulting from displacement of flying heights in a dual heater system due to changes in operating temperature. In the graph of FIG. 6, the line 602 represents writer heater power that results in writer contact at a 0% power ratio (normalized to 30° C.). The term power ratio in the context of FIG. 6 refers to a power ratio applied to the reader heater (e.g., $P_{Reader}(P_{Reader}+P_{Writer})$). For a power ratio of 100% (i.e., 1), for example, the reader heater power would be 100% and the writer heater power would be 0%. For a power ratio of 0% (i.e., 0), for example, the reader heater power would be 0% and the writer heater power would be 100%. Writer contact at a 0% power ratio (e.g., line 602 in FIG. 6) means that writer contact occurred with the writer heater power at 100% and the reader heater power at 0%. Each square on line 602 represents a writer contact event for a given temperature (i.e., shown in 10 degree Celsius increments) and dFOD value. The large square on line 602 at 30° C. (e.g., room temperature) is labeled point C, with the labels A' and B' in parentheses referring to the writer and reader pole tip protrusion scenario shown in FIG. 5B. The large square labeled point D on line 602 denotes writer pole tip contact at 60° C. (e.g., elevated temperature), with the label A in parentheses referring to the writer pole tip protrusion scenario shown in FIG. 5A. Line 602 shows that, as temperature changes from room temperature (RT) to a high temperature (HT), writer protrusion also changes.

The line 604 represents reader clearance change measured in-situ at 0% power ratio. The large triangle labeled point D' on line 604 denotes reader dFOD at 60° C., with the label B in parentheses referring to the reader pole tip protrusion scenario shown in FIG. 5A. Line 604 shows that, as temperature changes from room temperature (RT) to a high temperature (HT), reader protrusion also changes. Since both lines 602 and 604 were developed for a power ratio of 0%, FIG. 6 illustrates a comparison of writer and reader protrusion due to only the writer heater (since reader heater power is 0%). A comparison of lines 602 and 604 clearly shows that writer and reader protrusion change differently over the same temperature range. FIG. 6 demonstrates that when power is applied to either one of the writer and reader heaters, protrusion at the writer and reader increases but asymmetrically.

It can be seen that the change in writer dFOD and reader dFOD in FIG. 6 as a function of temperature change is not 1:1. Although the two lines 602 and 604 intersect at point C, they diverge thereafter, moving away from a 1:1 relationship as a function of temperature difference relative to that at Point C (i.e., 30° C.). As was discussed earlier, previous FOD techniques assumed that the pole tip protrusion of the writer and reader were equivalent, and FOD control signals were generated for the writer and reader based on this assumption. Experimentation has demonstrated that assuming a 1:1 change in writer dFOD and reader dFOD as a function of temperature change can be problematic, and may result in an unintended HDI touch due to an incorrect writer heater FOD control signal. For example, an experiment was performed based on a dual heater (individual writer and reader heaters) for a slider with nine bond pads, such as that shown in FIG. 2. It was determined that the actual ratio of the pole tip protrusion of the writer and reader was 0.4, with a standard deviation of 0.07.

Figure 7:
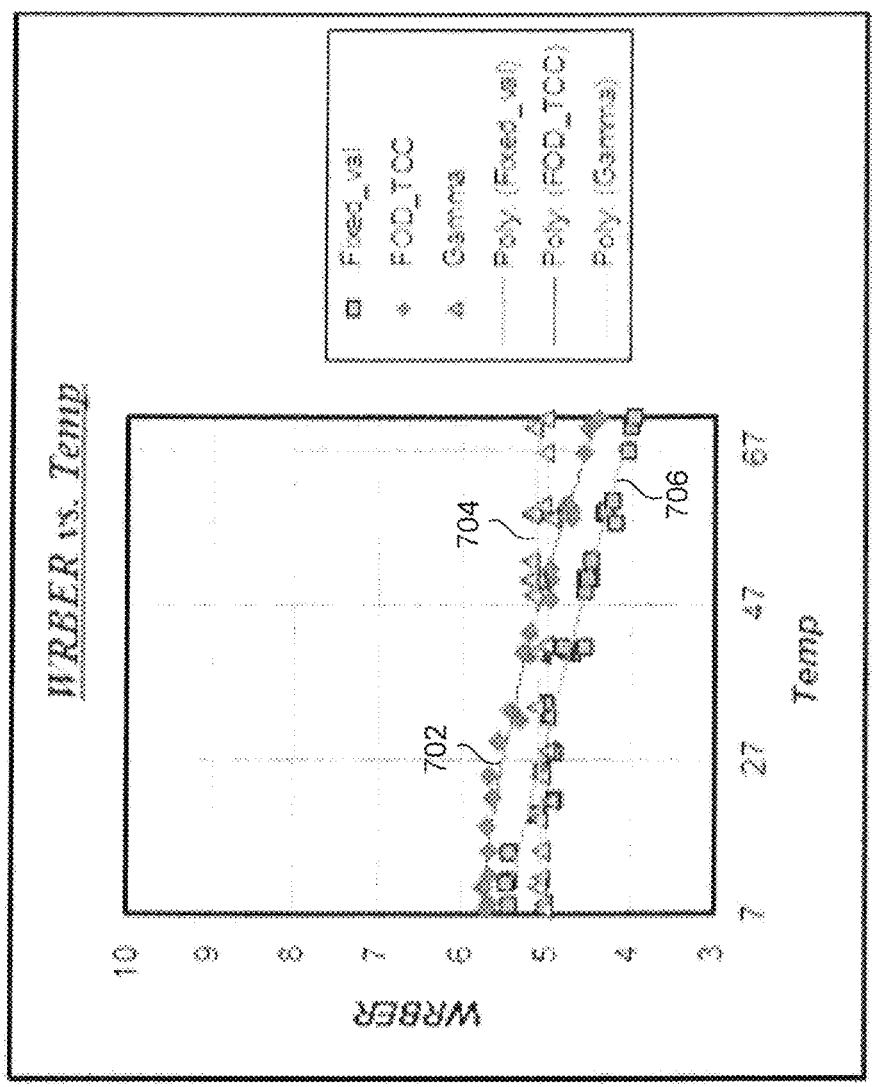
FIG. 7 shows a graph of writer and reader bit error rate as a function of operating temperature in accordance with embodiments of the disclosure.

FIG. 7 shows a graph of writer and reader bit error rate (WRBER) as a function of operating temperature. Line 702 shows data for operating the writer heater with an FOD signal based on a 1:1 PTP ratio. Line 704 shows data for operating the writer heater using an adaptive PTP ratio in accordance with embodiments of the disclosure. Line 706 shows data for operating the writer heater with a fixed value (e.g., an average touchdown (TD) ratio). It was determined that using the measured writer and reader pole tip protrusion ratio to adjust FOD writer heat power (e.g., an adaptive PTP ratio approach) resulted in WRBER values that were flat across all temperatures, as indicated by the data of line 704, with the distribution of WRBER improved by more than 50%. This improvement translates to greater stability in disk drive performance by implementing methodologies according to embodiments of the disclosure. Rather than assuming a 1:1 writer and reader pole tip protrusion ratio (see line 702) or using an averaged fixed value (see line 706), embodiments of the disclosure provide for in-situ adjustment of FOD writer heater power in response to changing operating temperatures.

According to some embodiments, a pole tip protrusion ratio calculation involves taking the heater power delta for 60° C. from line 602 (writer) and line 604 (reader). The change between points C, at 30° C., and D, at 60° C., (slope of C-D) represents the delta writer heater power, and the change between points C, at 30° C., and D', at 60° C., (slope of C-D') represents the delta reader heater power which resulted in the flying height displacement, a, of the slider. The pole tip protrusion (PTP) ratio resulting at different operating temperatures is given by the following equation:

$$PTP(\text{nm}/dac \text{ or } \text{mW}) = \frac{\text{protrusion (nm)}}{\text{FOD heater power } (dac \text{ or } \text{mW})} = \frac{\Delta \text{ protrusion (nm)}}{\Delta FOD \text{ heater power } (dac \text{ or } \text{mW})} \quad \text{Equation 1}$$

According to other embodiments, a pole tip protrusion ratio calculation involves measuring the fly height of the slider at a first temperature (e.g., an elevated temperature such as 60° C.), and measuring the fly height of the slider at a second temperature (e.g., a reduced temperature such as 30° C.). The difference between these two fly height measurements is the flying height displacement, a, of the slider. The PTP ratio resulting at different operating temperatures can be calculated using the following equation:

$$PTP \text{ ratio} = \frac{\text{Reader } PTP}{\text{Writer } PTP} = \frac{\frac{\Delta \text{ reader protrusion (nm)}}{\Delta FOD \text{ read heater power } (dac)}}{\frac{\Delta \text{ writer protrusion (nm)}}{\Delta FOD \text{ write heater power } (dac)}} \quad \text{Equation 2}$$

The FOD writer heater control signal can be adjusted based on the computed PTP value. The following is a representative example, with reference again to FIGS. 5 and 6. From Equation 2 above, displacement of slider clearance, a (nm) is changed against temperature (see FIG. 5). During this time, heater power is changed from C(A') to D(A) and from C(B') to D'(B) against temperature (see FIG. 6). In this illustrative example, the PTP ratio can be determined using the following equation:

$$PTP \text{ ratio} = \frac{\frac{\Delta \alpha}{\Delta \text{ Temperature}}}{\frac{C(B')-D'(B)}{\Delta \text{ Temperature}}} = \frac{\text{Slope } (C(A')-D(A))}{\text{Slope } (C(B')-D'(B))} \quad \text{Equation 3}$$

Based on the above, the FOD write heater power needed to make the writer protrusion meet a specified target can be calculated (e.g., Delta FOD write heater power=Delta FOD read heater power*PTP ratio).

Figure 8:
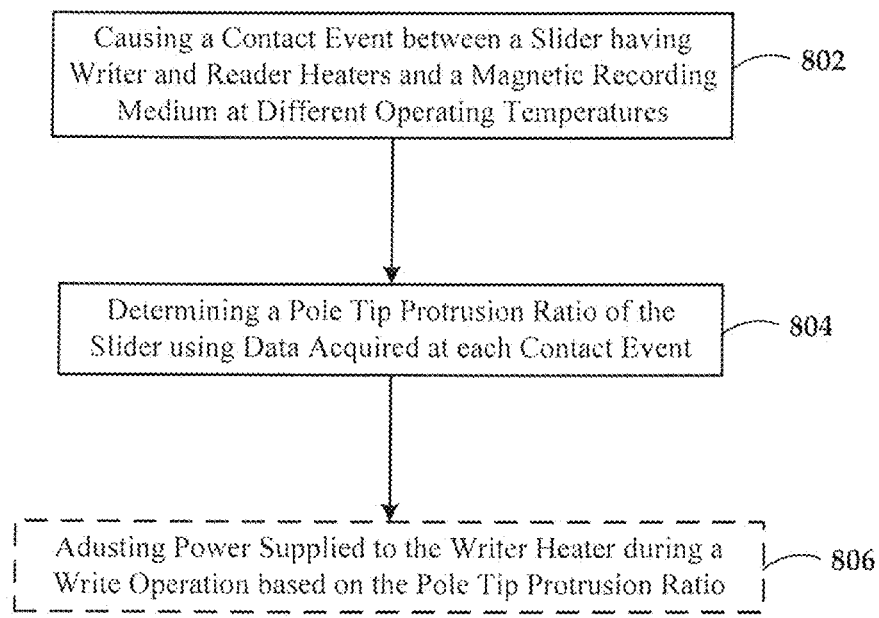
FIG. 8 is a flow chart illustrating a representative methodology in accordance with the present disclosure.

FIG. 8 is a flow chart illustrating a representative methodology in accordance with the present disclosure. The methodology of FIG. 8 involves causing 802 a contact event between a slider having writer and reader heaters and a magnetic recording medium at different operating temperatures. The methodology also involves determining 804 a pole tip protrusion ratio of the slider using data acquired at each contact event. The methodology may optionally involve adjusting 806 power supplied to the writer heater during a write operation based on the pole tip protrusion ratio.

Figure 9:
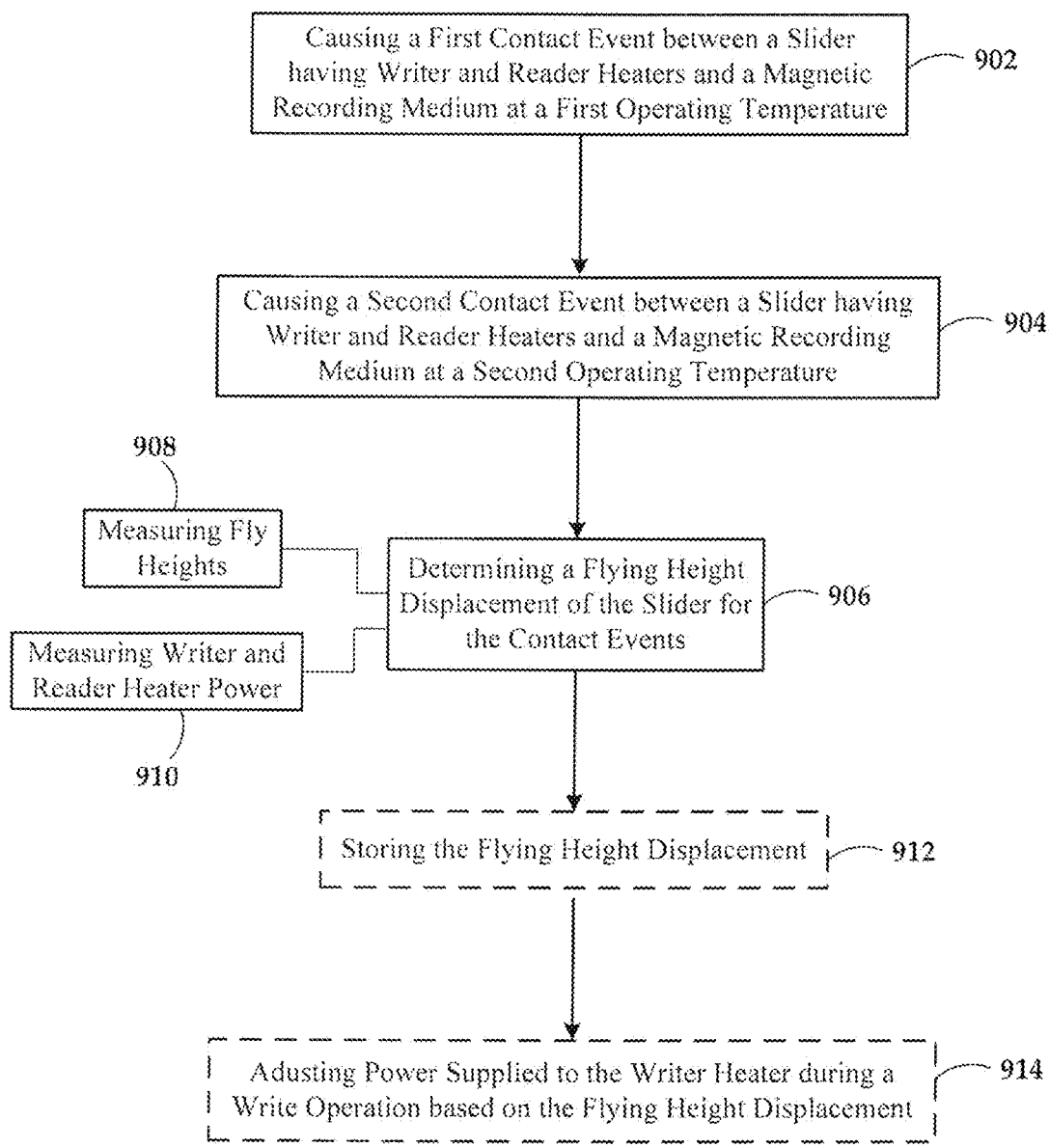
FIG. 9 is a flow chart illustrating another representative methodology in accordance with the present disclosure.

FIG. 9 is a flow chart that illustrates another representative methodology in accordance with the present disclosure. The methodology of FIG. 9 involves causing 902 a first contact event between a slider having writer and reader heaters and a magnetic recording medium at a first operating temperature. The methodology involves causing 904 a second contact event between a slider having writer and reader heaters and a magnetic recording medium at a second operating temperature. The methodology also involves determining 906 a flying height displacement of the slider for the contact events, such as by measuring 908 slider fly heights or measuring 910 writer and reader heater power. The methodology optionally involves storing 912 the flying height displacement and adjusting 914 power supplied to the writer heater during a write operation based on the flying height displacement.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
causing a first contact event between a slider and a magnetic recording medium at a first operating temperature, the slider comprising at least a writer, a writer heater, a reader, and a reader heater;
causing a second contact event between the slider and the medium at a second operating temperature different from the first operating temperature;
determining a flying height displacement of the slider for the contact events; and
storing the flying height displacement.

2. The method of claim 1, wherein:
the first operating temperature is ambient temperature; and
the second operating temperature is a temperature higher than ambient temperature.

3. The method of claim 1, wherein determining the flying height displacement of the slider comprises:
measuring fly heights at each contact event; and
determining a difference between the fly height measurements.

4. The method of claim 1, wherein determining the flying height displacement of the slider comprises:
determining a ratio of writer power and reader power associated with the contact events.

5. The method of claim 1, further comprising calculating a flying height displacement for one or more operating temperatures between the first and second operating temperatures.

6. The method of claim 1, further comprising:
adjusting power supplied to the writer heater during a write operation based at least in part on the stored flying height displacement.

7. The method of claim 1, further comprising:
controlling, by a flying height-on-demand controller, the writer heater based at least in part on the stored flying height displacement.

8. The method of claim 1, wherein determining the flying height displacement further comprises:
determining a pole tip protrusion ratio of the writer and the reader using the flying height displacement.

9. The method of claim 1, wherein determining the flying height displacement further comprises:
determining a pole tip protrusion ratio of the writer and the reader using a ratio of writer power and reader power associated with the contact events.

10. An apparatus, comprising:
a slider configured to interact with a magnetic recording medium, the slider comprising:
a writer;
a writer heater proximate the writer;
a reader; and
a reader heater proximate the reader; and
a processor coupled to memory, the processor configured to:
cause a first contact event between the slider and the magnetic recording medium at a first operating temperature;
cause a second contact event between the slider and the medium at a second operating temperature different from the first operating temperature;
determine a flying height displacement of the slider for the contact events; and
store the flying height displacement in the memory.

11. The apparatus of claim 10, wherein:
the first operating temperature is ambient temperature; and
the second operating temperature is a temperature higher than ambient temperature.

12. The apparatus of claim 10, wherein the processor is configured to:
measure fly heights at each contact event; and
determine a difference between the fly height measurements.

13. The apparatus of claim 10, wherein the processor is configured to determine a ratio of writer power and reader power associated with the contact events.

14. The apparatus of claim 10, wherein the processor is configured to calculate a flying height displacement for one or more operating temperatures between the first and second operating temperatures.

15. The apparatus of claim 10, wherein the processor is configured to adjust power supplied to the writer heater during a write operation based at least in part on the stored flying height displacement.

16. The apparatus of claim 10, wherein the processor is coupled to or comprises a flying height-on-demand controller configured to control the writer heater based at least in part on the flying height displacement stored in the memory.

17. The apparatus of claim 10, wherein the processor is configured to determine a pole tip protrusion ratio of the writer and the reader using the flying height displacement.

18. The apparatus of claim 10, wherein the processor is configured to determine a pole tip protrusion ratio of the writer and the reader using a ratio of writer power and reader power associated with the contact events.

19. An apparatus, comprising:
a slider configured to interact with a magnetic recording medium, the slider comprising:
a writer;
a writer heater proximate the writer;
a reader;
a reader heater proximate the reader;
a near-field transducer proximate the writer; and
an optical waveguide proximate the near-field transducer;
a processor coupled to memory, the processor configured to:
cause a first contact event between the slider and the magnetic recording medium at a first operating temperature;
cause a second contact event between the slider and the medium at a second operating temperature different from the first operating temperature;
determine a flying height displacement of the slider for the contact events; and
store the flying height displacement in the memory.

20. The apparatus of claim 19, wherein the processor is configured to adjust power supplied to the writer heater during a write operation based at least in part on the stored flying height displacement.

* * * * *